(12) United States Patent
Thalanany et al.

(10) Patent No.: US 9,445,312 B2
(45) Date of Patent: Sep. 13, 2016

(54) ENHANCED CONFIGURATION AND HANDOFF SCHEME FOR FEMTO SYSTEMS

(75) Inventors: Sebastian Thalanany, Kildeer, IL (US); Michael Irizarry, Algonquin, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 1741 days.

(21) Appl. No.: 11/968,017

(22) Filed: Dec. 31, 2007

(65) Prior Publication Data

US 2009/0168726 A1    Jul. 2, 2009

(51) Int. Cl.
*G06F 15/16*    (2006.01)
*G06F 15/173*   (2006.01)
*H04W 4/00*     (2009.01)
*H04W 36/00*    (2009.01)
*H04W 36/26*    (2009.01)
*H04W 36/24*    (2009.01)
*H04W 36/14*    (2009.01)
*H04W 84/04*    (2009.01)

(52) U.S. Cl.
CPC ..... *H04W 36/0011* (2013.01); *H04W 36/0055* (2013.01); *H04W 36/24* (2013.01); *H04W 36/26* (2013.01); *H04W 36/14* (2013.01); *H04W 84/045* (2013.01)

(58) Field of Classification Search
CPC . H04W 36/11; H04W 84/045; H04W 36/14; H04W 36/24; H04W 36/26; H04W 36/0055
USPC .......... 370/332; 455/436, 439; 709/223, 228
See application file for complete search history.

(56) References Cited

U.S. PATENT DOCUMENTS

| | | | | |
|---|---|---|---|---|
| 5,506,869 | A  * | 4/1996  | Royer ......................... | 375/224 |
| 5,548,808 | A  * | 8/1996  | Bruckert et al. ............. | 455/442 |
| 5,615,215 | A  * | 3/1997  | Utting et al. ................ | 370/337 |
| 6,381,457 | B1 * | 4/2002  | Carlsson et al. ........... | 455/435.2 |
| 6,556,824 | B1 * | 4/2003  | Purnadi et al. .............. | 455/442 |
| 6,567,666 | B2 * | 5/2003  | Czaja et al. ................. | 455/442 |
| 6,629,151 | B1 * | 9/2003  | Bahl ............................. | 709/250 |
| 6,944,144 | B2 * | 9/2005  | Guo et al. ..................... | 370/332 |
| 6,982,949 | B2 * | 1/2006  | Guo et al. ..................... | 370/210 |
| 7,006,472 | B1 * | 2/2006  | Immonen et al. ............ | 370/332 |
| 7,009,952 | B1 * | 3/2006  | Razavilar et al. ............ | 370/331 |
| 7,082,301 | B2 * | 7/2006  | Jagadeesan et al. .......... | 455/436 |
| 7,092,405 | B2 * | 8/2006  | Guo et al. ..................... | 370/468 |
| 7,149,524 | B2 * | 12/2006 | Reynolds ..................... | 455/437 |

(Continued)

OTHER PUBLICATIONS

Camarillo, G., W. Marshall, and J. Rosenberg, Integration of Resource Management and Session Initiation Protocol (SIP) RFC 3312 (Oct. 2002).

(Continued)

*Primary Examiner* — Daniel C Murray
(74) *Attorney, Agent, or Firm* — Leydig, Voit & Mayer, Ltd.

(57) ABSTRACT

The enhanced configuration and handoff scheme leverages the configuration of the Femto system, the Femto access network conditions and the mobile device conditions to facilitate an attractive user-experience. In an embodiment, the invention is based on the use of the access network conditions, IP (Internet Protocol) multimedia service QoS constraints, and the user profile for an enhanced configuration and handoff scheme, in a multimode Femto system.

21 Claims, 9 Drawing Sheets

(56) References Cited

U.S. PATENT DOCUMENTS

| | | | |
|---|---|---|---|
| 7,151,931 B2* | 12/2006 | Tsao et al. | 455/435.2 |
| 7,154,869 B2* | 12/2006 | Guo et al. | 370/331 |
| 7,162,236 B2* | 1/2007 | Dorenbosch et al. | 455/432.1 |
| 7,245,915 B2* | 7/2007 | Matta et al. | 455/436 |
| 7,280,506 B2* | 10/2007 | Lin et al. | 370/331 |
| 7,310,527 B2* | 12/2007 | Jagadeesan et al. | 455/436 |
| 7,403,778 B2* | 7/2008 | Reynolds | H04W 36/24 370/331 |
| 7,426,178 B2* | 9/2008 | Guo et al. | 370/210 |
| 7,492,737 B1* | 2/2009 | Fong et al. | 370/331 |
| 7,499,432 B2* | 3/2009 | Guo et al. | 370/332 |
| 7,546,125 B2* | 6/2009 | Sharma et al. | 455/436 |
| 7,574,212 B2* | 8/2009 | McConnell et al. | 455/437 |
| 7,738,873 B2* | 6/2010 | Jagadeesan et al. | 455/436 |
| 7,792,081 B2* | 9/2010 | Kim et al. | 370/331 |
| 7,920,523 B2* | 4/2011 | Grinshpun et al. | 370/331 |
| RE42,537 E* | 7/2011 | Lin et al. | 370/331 |
| 8,054,802 B2* | 11/2011 | Burgess et al. | 370/331 |
| 8,068,838 B1* | 11/2011 | Dinan et al. | 455/436 |
| 8,145,210 B2* | 3/2012 | Thalanany et al. | 455/432.1 |
| 8,289,861 B2* | 10/2012 | Zafer et al. | 370/252 |
| 8,385,216 B1* | 2/2013 | Shetty et al. | 370/252 |
| 8,432,832 B2* | 4/2013 | Zuk et al. | 370/254 |
| 8,438,252 B2* | 5/2013 | Zuk et al. | 709/220 |
| 8,483,704 B2* | 7/2013 | Nanda et al. | 455/456.1 |
| 8,494,543 B2* | 7/2013 | Koodli et al. | 455/453 |
| 8,571,558 B1* | 10/2013 | Dinan et al. | 455/436 |
| 8,611,302 B2* | 12/2013 | Van Den Berg et al. | 370/331 |
| 8,750,245 B2* | 6/2014 | Bakthavathsalu et al. | 370/331 |
| 8,750,875 B2* | 6/2014 | Macias et al. | 455/436 |
| 8,902,853 B2* | 12/2014 | Kruglick | 370/331 |
| 2002/0087674 A1 | 7/2002 | Guilford et al. | |
| 2002/0102977 A1* | 8/2002 | Shi | 455/437 |
| 2003/0005112 A1* | 1/2003 | Krautkremer | 709/224 |
| 2003/0069018 A1* | 4/2003 | Matta et al. | 455/436 |
| 2003/0125028 A1* | 7/2003 | Reynolds | 455/437 |
| 2003/0137951 A1* | 7/2003 | Otsuka et al. | 370/328 |
| 2004/0008689 A1* | 1/2004 | Westphal et al. | 370/395.21 |
| 2004/0038685 A1* | 2/2004 | Nakabayashi | 455/452.2 |
| 2004/0156329 A1* | 8/2004 | Bck et al. | 370/328 |
| 2004/0170122 A1* | 9/2004 | Guo et al. | 370/210 |
| 2004/0170191 A1* | 9/2004 | Guo et al. | 370/468 |
| 2004/0203792 A1* | 10/2004 | Shaheen et al. | 455/444 |
| 2004/0218607 A1 | 11/2004 | Hurtta et al. | |
| 2004/0219918 A1* | 11/2004 | Kakishima et al. | 455/436 |
| 2004/0223489 A1 | 11/2004 | Rotsten et al. | |
| 2005/0059400 A1* | 3/2005 | Jagadeesan et al. | 455/436 |
| 2005/0068965 A1* | 3/2005 | Lin et al. | 370/395.21 |
| 2005/0068982 A1* | 3/2005 | Guo et al. | 370/468 |
| 2005/0083874 A1* | 4/2005 | Guo et al. | 370/328 |
| 2005/0128956 A1 | 6/2005 | Hsu et al. | |
| 2005/0135310 A1 | 6/2005 | Cromer et al. | |
| 2005/0213542 A1* | 9/2005 | Guo et al. | 370/332 |
| 2005/0250508 A1* | 11/2005 | Guo et al. | 455/452.1 |
| 2005/0265284 A1* | 12/2005 | Hsu et al. | 370/331 |
| 2006/0019659 A1 | 1/2006 | Rosenberg et al. | |
| 2006/0205407 A1* | 9/2006 | Jagadeesan et al. | 455/436 |
| 2006/0227746 A1* | 10/2006 | Kim et al. | 370/331 |
| 2006/0245392 A1 | 11/2006 | Buckley et al. | |
| 2006/0276192 A1* | 12/2006 | Dutta et al. | 455/436 |
| 2006/0291419 A1 | 12/2006 | McConnell et al. | |
| 2007/0021126 A1* | 1/2007 | Nanda et al. | 455/456.1 |
| 2007/0076664 A1* | 4/2007 | An et al. | 370/331 |
| 2007/0115887 A1* | 5/2007 | Baek et al. | 370/331 |
| 2007/0117564 A1* | 5/2007 | Reynolds | H04W 36/24 455/436 |
| 2007/0147320 A1* | 6/2007 | Sattari et al. | 370/338 |
| 2007/0160072 A1 | 7/2007 | Thalanany et al. | |
| 2007/0223421 A1* | 9/2007 | Zafer et al. | 370/331 |
| 2007/0291717 A1* | 12/2007 | Williams et al. | 370/338 |
| 2008/0076428 A1* | 3/2008 | Jagadeesan et al. | 455/436 |
| 2008/0095111 A1* | 4/2008 | Kim et al. | 370/331 |
| 2008/0137613 A1* | 6/2008 | Berg et al. | 370/331 |
| 2008/0159232 A1 | 7/2008 | Thalanany et al. | |
| 2008/0176569 A1* | 7/2008 | Jung et al. | 455/436 |
| 2008/0316982 A1* | 12/2008 | Murty et al. | 370/338 |
| 2008/0320108 A1* | 12/2008 | Murty et al. | 709/220 |
| 2009/0092078 A1* | 4/2009 | Czaja et al. | 370/328 |
| 2009/0092096 A1* | 4/2009 | Czaja et al. | 370/331 |
| 2009/0093246 A1* | 4/2009 | Czaja et al. | 455/422.1 |
| 2009/0093252 A1* | 4/2009 | Czaja et al. | 455/436 |
| 2009/0111468 A1* | 4/2009 | Burgess et al. | 455/436 |
| 2009/0129296 A1* | 5/2009 | Grinshpun et al. | 370/261 |
| 2009/0141683 A1* | 6/2009 | Grinshpun et al. | 370/331 |
| 2009/0168726 A1 | 7/2009 | Thalanany et al. | |
| 2009/0175201 A1* | 7/2009 | Guo | 370/254 |
| 2009/0175239 A1* | 7/2009 | Grinshpun et al. | 370/331 |
| 2009/0264131 A1* | 10/2009 | Wu et al. | 455/436 |
| 2010/0091653 A1* | 4/2010 | Koodli et al. | 370/235 |
| 2010/0150107 A1* | 6/2010 | Aghvami et al. | 370/331 |
| 2010/0309847 A1* | 12/2010 | Bharadwaj | 370/328 |
| 2011/0170518 A1* | 7/2011 | Randriamasy et al. | 370/331 |
| 2012/0063414 A1* | 3/2012 | Ramachandran | 370/331 |
| 2012/0163344 A1* | 6/2012 | Bakthavathsalu et al. | 370/332 |
| 2012/0218897 A1* | 8/2012 | Aramoto et al. | 370/235 |
| 2012/0218975 A1* | 8/2012 | Aramoto et al. | 370/331 |
| 2012/0250658 A1* | 10/2012 | Eisl et al. | 370/331 |
| 2012/0300622 A1* | 11/2012 | Kruglick | 370/230 |
| 2013/0065632 A1* | 3/2013 | Macias et al. | 455/525 |
| 2013/0136106 A1* | 5/2013 | Shetty et al. | 370/331 |
| 2013/0252641 A1* | 9/2013 | Pampu et al. | 455/456.5 |
| 2013/0310042 A1* | 11/2013 | Wu et al. | 455/436 |
| 2014/0098794 A1* | 4/2014 | Van Den Berg et al. | 370/332 |

OTHER PUBLICATIONS

Garcia-Martin et al., "Private Header (P-Header) Extensions to the Session Initiation Protocol (SIP) for the 3rd —Generation Partnership Project (3GPP)", The Internet Society, RFC 3455 (Jan. 2003) (34 pages).

Gohring, "Nokia Simplifies Dual-Mode Phones," 1DG News Service (Oct. 31, 2006), obtained from the Internet at http://www.pcworld.com/article/id, 127713-page, 1-c, cellphones/article.html (3 pages).

Granstrom et al. "The Future of Communication Using SIP," Ericsson Review No. 1 (2002) (8 pages).

Gustafson, "Network Design with Mobile IP," Internet Society inet2001 Proceedings obtained from the internet at http://fto.isoc.orci/inet2001/CD Droceedinas/T40/inetT40.htm on Dec. 4, 2006 (23 pages).

Handley, M. and V. Jacobson, "SDP: Session Description Protocol," RFC 2327 (Apr. 1998) (40 pages).

Kavak, "Ericsson's Network-Based IP-VPN Solutions," Ericsson Review Nos. 3 (2000) (14 pages).

Kasargod et al. "Packet Data in the Ericsson CDMA2000 Radio Access Network," Ericsson Review No. 3 (2002) (8 pages).

Langer et al. "CDMA2000—A World View," Ericsson Review No. 3 (2001) (9 pages).

Rosenberg et al. "SIP: Session Initiation Protocol," RFC 3261, IETF (Jun. 2002).

3rd Generation Partnership Project 2, "IP Network Architecture Model for cdma2000 Spread Spectrum Systems," 3GPP2 S.R0037-0 v3.0 (Aug. 21, 2003) (52 pages).

3rd Generation Partnership Project 2 (3GPP2), "All-IP Network Architecture Model for cdma2000 Spread Spectrum Systems," S.R0037-0 V3.0 (Sep. 2003).

3rd Generation Partnership Project 2, "All-IP Core Network Multimedia Domain," 3GPP2 X.S0013=002-A v1.0 (Nov. 2005) (179 pages).

* cited by examiner

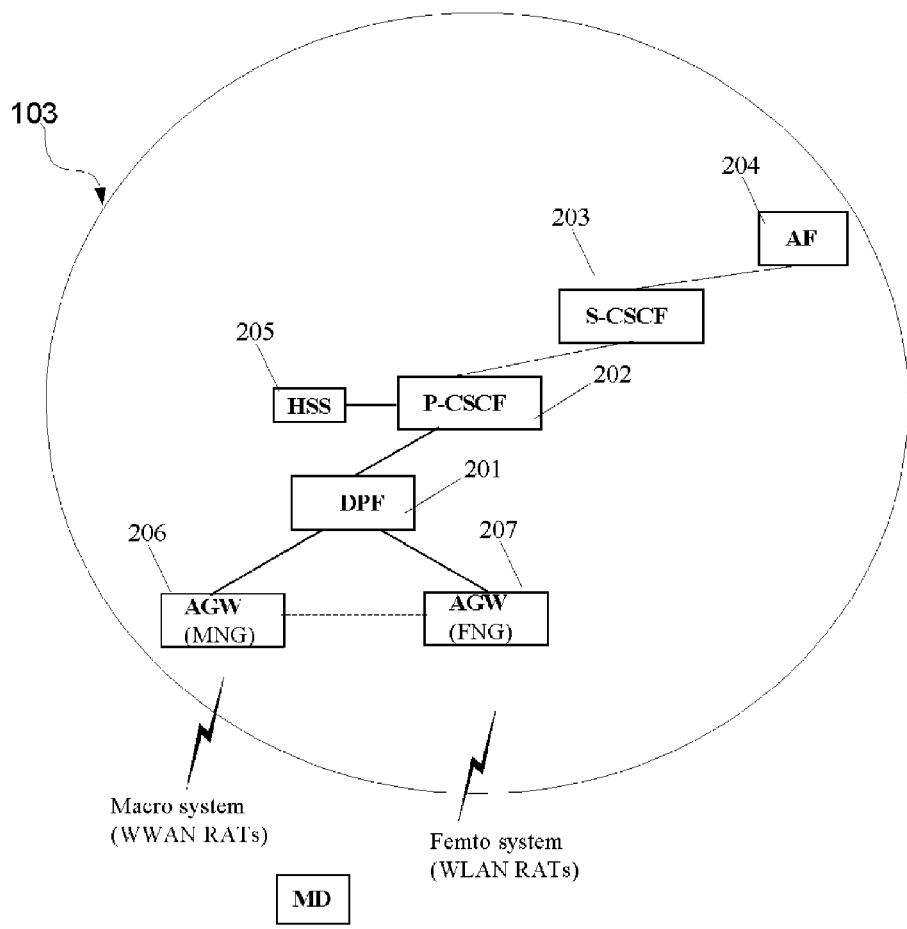

Legend:

| | |
|---|---|
| AGW | - Access Gateway associated with a Femto system (FNG) or a Macro system (MNG) |
| P-CSCF | - Proxy server, which provides call control for the application (Proxy – Call Session Control Function) |
| S-CSCF | - Server, which provides call control for the application (Serving – Call Session Control Function) |
| HSS | - Home Subscriber Server, which is a database used to manage subscription, authentication, and location information |
| AF | - Application Function |
| MD | - Mobile Device with multiple access technology (radio) interfaces |
| DPF | - Dynamic Policy Function, which creates a dynamic policy for the access network based on network conditions and an administrative policy |
| WWAN | - Wireless Wide Area Network (Macro system) |
| WLAN | - Wireless Local Area Network (Femto system) |

FIG. 2

ENHANCED CONFIGURATION AND HANDOFF SCHEME FOR FEMTO SYSTEMS

TECHNICAL FIELD

This patent disclosure relates generally to cellular communications and, more particularly to a system and method for more efficient handoff within a cellular system.

BACKGROUND

In a heterogeneous wireless mobile access technology environment the end-user service experience must be preserved across the different access technology environments. In this context, a multi-mode Femto system provides an end-user with in-building wireless mobile access to a variety of services. The multi-mode Femto system accommodates a variety of existing and emerging radio access technologies to enable connectivity for a variety of multi-mode mobile devices, such as smart phone/data devices, for the end-user access to services. The Femto system consists primarily of the MD (Mobile Device), FAP (Femto Access Point), FNG (Femto Network Gateway), and the OAM&P (Operation, Administration, Maintenance and Provisioning) entities. In contrast with a Macro system (Wide Area Cellular Network), the FAP entity in a Femto system provides a much smaller physical footprint as compared to the BS (Base Station) in the Macro system.

In such an environment, limited usability of the FAP, and the handoff related performance degradation across the Femto system and the Macro system, are detrimental to the end-user service experience. Limitations in the end-user usability of the FAP, such as the restriction of usage to a single location, or a single access provider, would be an impediment to the user experience. In the case of handoff across the Macro system and the Femto system, a degradation of the service delivery, as a result of latencies and packet losses, is likely to adversely impact the end-user experience.

In the absence of an enhanced configuration and handoff scheme for the multi-mode Femto system, which enables a variety of usage scenarios for the end-user, while also preserving the service related QoS constraints in the presence of handoffs between the Femto system and the Macro system, both the resource utilization in the corresponding system, and the end-user experience are adversely impacted.

For the widespread adoption of the Femto system, both configurability and handoffs aspects are required to be addressed for an attractive end-user experience. In the case of configurability, a combination of the user profile and the access network policy are leveraged to enable the end-user to utilize the FAP at one or more locations. In the case of handoff, an awareness of the associated network resources, potential target networks, and the QoS constraints associated with a launched service are leveraged to for the detection and the execution of a handoff to a target network. Since the end-user usage scenarios are subject to individual choices, and authorized user profiles, and the handoff scenarios are subject to a variety service QoS constraints, access network conditions, and access network policies, an enhanced configuration and handoff scheme for Femto systems is required. The handoff scheme operates within the context of a configuration of the Femto system, and supports an efficient handoff across the Femto system and the Macro system. The support of the QoS constraints associated with a service is impacted by the access network conditions, as well as by the conditions of the MD (Mobile Device). The network conditions, such as bandwidth and capacity degradation are likely to adversely impact the established QoS associated with an application. The mobile device conditions such as mobility, received signal quality and battery life are also likely to be detrimental to the established QoS associated with the application.

SUMMARY

The enhanced configuration and handoff scheme utilizes a collaborative leveraging of the configuration of the Femto system, the Femto access network conditions and the mobile device conditions to facilitate an attractive user-experience. The invention is based on the use of the access network conditions, IP (Internet Protocol) multimedia service QoS constraints, and the user profile for an enhanced configuration and handoff scheme, in a multimode Femto system.

In a next-generation heterogeneous access technology landscape, Femto systems may exist either as an isolated radio access system, for in-building wireless access, or together with a Macro system (Wide area cellular radio access) overlay.

A next-generation multi-mode Femto system that supports a variety of RATs (Radio Access Technologies) may support existing radio access technologies (1×, 1×EV-DO, HSPA, and WiFi) as well as the emerging RATs such as UMB, LTE, and WiMAX for IP multimedia services over a packet data connection. The FAP (Femto Access Point) and the FNG (Femto Network Gateway) are the primary entities in the Femto system. The MD (Mobile Device), which is a multimode device, may be served by the AGW (Access GateWay) in the Macro system, or in the Femto system.

This invention describes a procedure for the following capabilities:
1. User profile based configuration of the Femto system for remote access to the home domain;
2. QoS constraint based optimized handoff across Femto and Macro systems in the case of a Macro overlay;
3. Notifications for system planning; and
4. Shared use of a Femto system.

The use of procedures that leverage a profile driven configuration enable end-users to maximize the use of a multimode Femto system in a variety of environments. The profile may also be leveraged to grant Femto access permissions to other subscribers that may not own the Femto system. The QoS component of the profile enables procedures for optimized handoffs across Femto and Macro environments, where a Macro overlay exists. The notifications that are triggered by the presence of a Femto system are leveraged to assist system planning.

These capabilities maximize the end-user experience, while enhancing resource utilization for operators.

BRIEF DESCRIPTION OF THE DRAWINGS

FIG. 2 illustrates a schematic representation of a IEHN (IMS Enabled Home Network) context for access usable in an embodiment of the invention;

DETAILED DESCRIPTION

This invention includes, in an embodiment, an enhanced configuration and handoff scheme, where the MD and the FAP with multiple RAT (Radio Access Technology) support collaborate with an IMS (IP Multimedia Subsystem) enabled home network for flexible configuration options, to orchestrate a seamless handoff of IP multimedia applications across the Femto system and the Macro system, using the available wireless access technologies. The MD collaborates with a FAP, in an embodiment to facilitate an attractive user-experience, with respect to a ubiquitous access to IP multimedia applications. Both the MD and the FAP support a variety of RATs, where WLAN (Wireless Local Area Network) accesses (e.g. IEEE 802.11, 802.16 families) are supported as a default.

Figure 1:
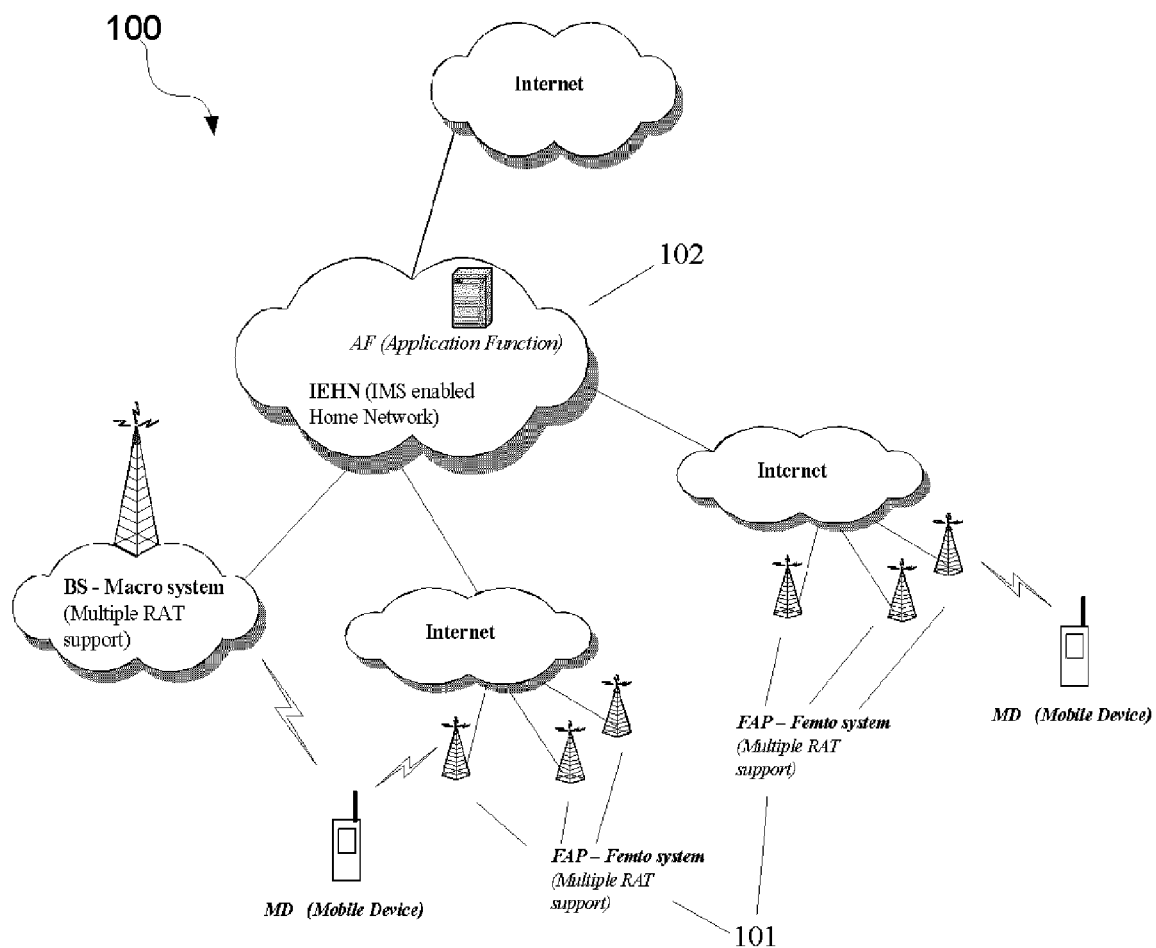
FIG. 1 illustrates a schematic representation of a Femto system and Macro system wireless mobile access network environment usable in an embodiment of the invention.

A Femto system and Macro system wireless mobile access network environment 100 within which embodiments of the invention may be implemented is shown in FIG. 1. The Femto system entities include the FAP 101 and an associated AGW (Access GateWay), referred to as the FNG (Femto Network Gateway). The Macro system entities include the BS (Base Station) and an associated AGW, referred to as the MNG (Macro Network Gateway). The Macro system and the Femto system access networks are attached to an IEHN (IMS Enabled Home Network) 102, where a variety of wide-area and local-area access technologies are supported. The IEHN 102 is shown in greater detail in FIG. 2.

In the IEHN 102, the entities that participate, in the enhanced configuration and handoff operation, are the DPF (Dynamic Policy Function) 201, the P-CSCF (Proxy-Call Session Control Function) 202, and the S-CSCF (Serving-Call Session Control Function) 203, the AF (Application Function) 204, and the HSS (Home Subscriber Server) function 205.

The IEHN 102 supports a variety of RATs through corresponding AGWs 206, 207. For a Femto system, the FAP is served by an FNG, while for the Macro system, the BS is served by an MNG. The entities in the IEHN 102 interact with the MD and the FAP to provide the initial configuration for access, as well as for subsequent handoff triggers for access, via a selected target system, which may be a Femto system or a Macro system, based on network conditions or MD conditions.

Figure 3:
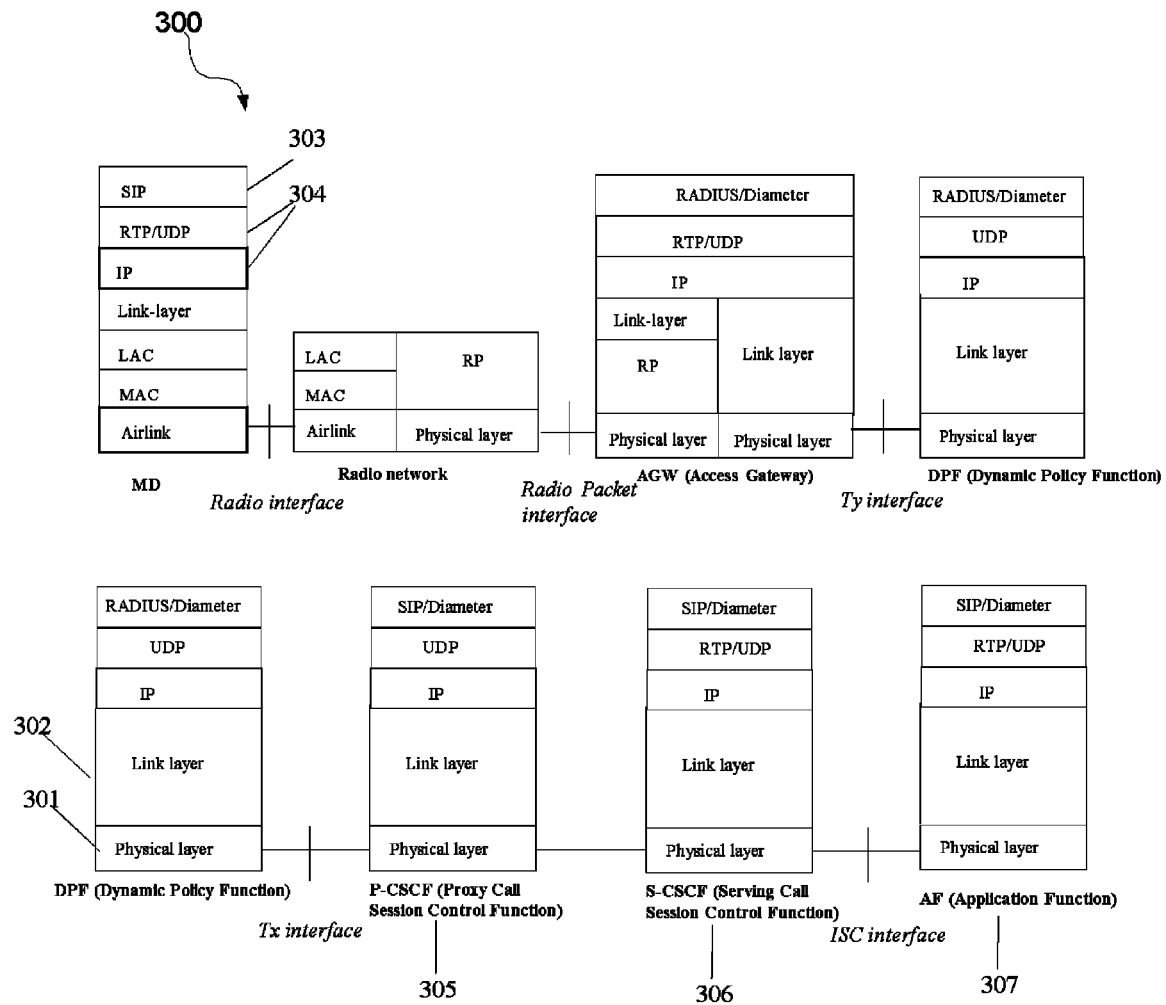
FIG. 3 illustrates a protocol reference model within which the disclosed principles may be implemented.
Figure 4:
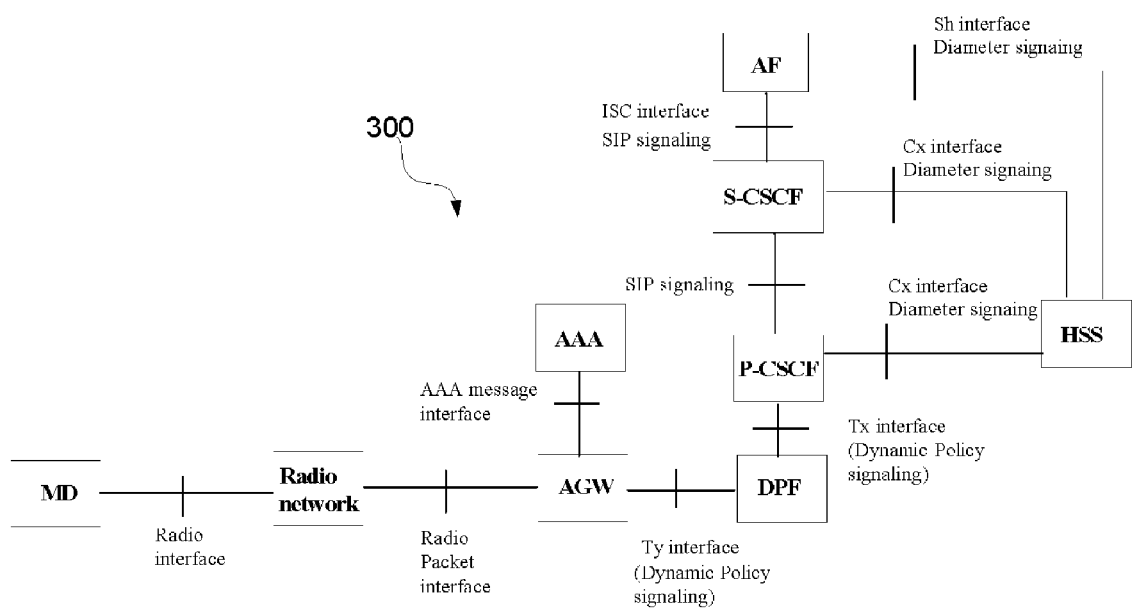
FIG. 4 illustrates a functional model in accordance with the disclosed principles.

A protocol reference model 300 for a heterogeneous wireless mobile access network environment associated with an IEHN is shown in FIG. 3. Although certain physical layer 301 and the link layer 302 protocols are illustrated, it will be appreciated that these may be different for different wireless mobile access technologies. For inter-operability, the protocols at the network layer and above are preferably based on open standards. In this model the application control is performed via SIP 303, and the application media streams are conveyed over RTP/UDP/IP 304. The P-CSCF (Proxy Call Session Control Function) 305 is a SIP proxy and communicates with the DPF (Dynamic Policy Function) and the S-CSCF (Serving Call Session Control Function) 306. The S-CSCF communicates with the AS (Application Server or AF) 307 for control purposes. The P-CSCF, PF, S-CSCF and the AF are functional entities that are a part of the IMS framework. The MD (Mobile Device) and the AF communicate to establish and maintain an application launched by the user. This can also be seen in the functional diagram 400 of FIG. 4.

The network conditions, which influence a dynamic network policy are used for resource allocation and enforcement in each of the AGWs associated with a Femto system or a Macro system. The network conditions are characterized in terms of bandwidth latency, packet loss and capacity. The dynamic network policy is formulated within the DPF. The dynamic network policy includes a combination of statically provisioned policies, based on system capacity and utilization, current network conditions, and subscription profiles. The DPF interacts with each of the AGWs that support a Femto system or a Macro system, as well as with the S-CSCFs in the IEHN.

The AST (Access System Type) identifies either a Femto system or Macro system. The AGW, which is either a FNG (AGW associated with the Femto system) or a MNG (AGW associated with the Macro system), is identified by the ASI (Access System Identifier). An S-FNG (Serving FNG) is an AGW to which the MD is currently attached, while a T-FNG refers to an AGW to which the MD is expected to be connected, when a handoff operation is completed. Similarly, an S-MNG (Serving MNG) is an AGW to which the MD is currently attached, while a T-MNG refers to an AGW to which the MD is expected to be connected, when a handoff operation is completed.

A Macro system may or may not overlay a Femto system in any given geographic area. A Macro system or a Femto system supports a multiple RAT (Radio Access Technology) connection capability.

During the initial setup process, the MD and the FAP establish a connection based on the default WLAN RAT, which supported in the multi-mode MD and in the multi-mode FAP. This allows the off-loading of mobile devices, in the vicinity of a FAP, from a WWAN (Wireless Wide Area Network) RAT, for potential capacity gains over a relatively lower bandwidth link. The applications that are launched by the MD are transported, via the FAP in the Femto system, to a corresponding AF in the IEHN. The Femto system provides the transport for a launched application until a change in one or more of the following events occur:

a. Change in a handoff threshold that triggers a handoff operation b. Change in the RSQ or battery-life condition at the MD that triggers a handoff operation Event a) is driven by one or more of the following conditions:

1. Change in the network conditions that affect the currently active Femto system or Macro system, in terms of the QoS constraints that are required to be supported for the launched application 2. Change in the network policies that affect the currently active Femto system or Macro system, in terms of the QoS constraints that are required to be supported for the launched application 3. Event b) is driven by one or more of the following conditions:

4. Change in RSQ or battery-life, over the active RAT, in the Femto system or the Macro system, which affects the QoS constraints that are required to be supported for the launched application Each access system (Femto or Macro) is uniquely identified by the AST. Within each access system (Femto or Macro), the associated AGW (FNG or MNG) is uniquely identified by the ASI.

The FAP is factory configured with the following parameters:
 a. Manufacturer's URL (Uniform Resource Locator)
 b. Hardware identifier (e.g. MAC address)
 c. List of supported RATs The MD is provisioned with the following parameters:
 a. Subscription profile that includes support for Femto system Macro system After the MD has established a connection with a FAP, in the Femto system, the initial power-up and configuration operation have concluded. The MD is provided with the current HTP (Handoff Threshold Profile) as a part of the initial power-up and configuration operation. The MD utilizes the SIP SUBSCRIBE/NOTIFY procedures to be notified, by the allocated S-CSCF in the IEHN, of any changes in the HTP.

The MD utilizes the received HTP to trigger a handoff operation to a target system (Femto or Macro) as identified in the HTP. The parameters in the HTP consist of the following:
 1. AST
 2. ASI list
 3. RAT list The data structure for the AST is as follows:
AST: System type (0, or 1)
Priority (0, or 1)
Status (0, or 1)
The definitions for the AST data structure are:
System type: Femto system (0)
 Macro system (1)
Priority: 0 denotes high priority
 1 denotes low priority
Status: 0 denotes enabled
 1 denotes disabled
The data structure for the ASI is as follows:
ASI: AGW type (0, or 1)
 Priority (0 ... N), where N is the list of available AGWs
The definitions for the ASI data structure are:
AGW type: FNG (0)
 MNG (1)
Priority: 0 denotes the highest priority
 N denotes the lowest priority in the range (0 to N)
The data structure for the RAT is as follows:
RAT: RAT type (0 to M)
 Priority (0 ... M), where M is the list of available RATs
The definitions for the RAT data structure are:
RAT type: WLAN (0)
 Other RATs (1 to M)
Priority: 0 denotes the highest priority
 M denotes the lowest priority in the range (0 to M)

The MD also utilizes the RSQ (Received Signal Quality) and the battery-life condition to trigger a handoff operation. For any given HTP, if the MD detects degradation in the RSQ or the battery life condition, the MD proactively triggers a handoff operation within the allowable limits of the HTP. In the case of battery-life degradation, the MD may trigger a handoff to a FAP based access, since typically the transmit power requirements are lower for a WLAN type of access to prolong the availability of an existing application for an enhanced user experience.

During the initial power-up and configuration of the MD and the FAP, the MD detects the presence of the FAP, and registers its wireless access over the detected default WLAN RAT. During this registration the FAP discovers the MD identifier for use in the Request-URI field of a SIP REGISTER message. The FAP performs IP address acquisition procedures to establish IP connectivity between the FAP and the MD, using the backhaul ISP (Internet Service Provider). The FAP sends SIP REGISTER message to the MD. If the MD subscription profile allows the MD to utilize a Femto system, then the MD processes the SIP REGISTER message. The SIP REGISTER message includes the following to fields:
 Request-URI: This is the domain name of the serving system, such as: "sip: realm-identifier.com"
 To: This field contains the SIP URI of the FAP, which requires creation, or modification.
 From: This field contains the SIP URI of the user, who is associated with the registration. The value of this field is identical to that for the "To" header.
 Call-ID: This field contains a globally unique identifier for the user agent client, in the FAP, for the serving system
 Cseq: This field contains the sequence number associated with a SIP REGISTER message.
 P-Access-Network-Info: <Manufacturer URI; Hardware ID; List of supported RATs>

The MD sends a SIP UPDATE message that includes the following fields:
 To: This field contains the SIP URI of the FAP
 From: This field contains the SIP URI of the user. The value of this field is identical to that for the "To" header.
 Call-ID: This field contains a globally unique identifier for the SIP UPDATE message
 Cseq: This field contains the sequence number associated with a SIP UPDATE message.
 P-Access-Network-Info: <URI of the S-CSCF in the IEHN; Derived NAI (Network Access Identifier) based authentication credentials The FAP utilizes the URI of the designated S-CSCF to acquire the identity of the S-FNG (Serving FNG) in the IEHN. The identity of the S-FNG is conveyed to the MD, via the P-Access-Network-Info field in a 200 OK message to the MD. A secure packet data session is established between the MD and the S-FNG, via the FAP.

The FAP uses the SIP registration procedure with the designated S-CSCF, in the IEHN, to complete the following:
 1. Authentication of the FAP, using the derived authentication credentials provided by the MD;
 2. Transfer of a list of RATs supported by the FAP; and
 3. Active RAT for the established link between the MD and the FAP.

After the FAP completes its registration with the IEHN, it proxies the MD SIP REGISTER message to the designated S-CSCF in the IEHN. In the case of a successful registration, the MD is authenticated and authorized for services in the IEHN, via the Femto system.

At any stage of the establishment of communications between the MD and the S-CSCF, in the IEHN, via the FAP, if a failure occurs, then the configuration process is aborted. The MD may establish communications with the S-CSCF in the IEHN, via the Macro system, if it is available.

The S-CSCF sends a SIP UPDATE message to the MD that includes the following fields:
  Via: List of proxies to be traversed including the FAP
  To: This field contains the SIP URI of the MD
  From: This field contains the SIP URI of the user. The value of this field is identical to that for the "To" header.
  Call-ID: This field contains a globally unique identifier for the SIP UPDATE message
  Cseq: This field contains the sequence number associated with a SIP UPDATE message.
  P-Access-Network-Info: <HTP>

The MD is now provided with the current HTP, which is utilized for triggering a handoff operation to support the QoS constraints associated with an application, after it is launched by the MD. The generalized configuration of the FAP and its association with the MD, allows the use of the FAP with different MDs with Femto support capabilities.

Access System Usage Notification for System Planning

In the MD SIP REGISTER message, the MD access system usage, in terms of the frequency of access, via the Femto system and the Macro system, per unit of time, is conveyed to the S-CSCF in the IEHN. The unit of time is configurable in the subscription profile, and may be specified in terms of hours or days. The unit of time is conveyed via a 200 OK response to the SIP REGISTER, in the P-Access-Network-Info field. Alternatively, the S-CSCF may send a SIP UPDATE message to the MD to configure the unit of time associated with the frequency of access to a Femto system and to a Macro system. Subsequently, the MD uses the SIP UPDATE message to convey, the MD frequency of access to a Femto system and a Macro system, to the S-CSCF, in the IEHN.

The S-CSCF conveys the MD system access usage frequency breakdown to the DPF, in the IEHN. This information is used as input to update and provision network policies to optimize the utilization of network resources, across Macro system and Femto system based access.

Enhanced Handoff Scheme Across a Femto System and a Macro System

The MD sends a SIP SUBSCRIBE message to the S-CSCF to get notified about any changes to the HTP that would proactively trigger a handoff operation across RATs within the same system (Femto or Macro) or across a Femto system and a Macro system. The DPF updates the S-CSCF in the IEHN, with the latest HTP, when policy changes occur as a result of network conditions and or administrative operations.

The MD initiates a handoff operation based on an HTP notification and or a change in the RSQ/battery-life conditions to preserve the user-experience by maintaining the QoS constraints within the bounds that were specified, when an application was launched.

Figure 5:
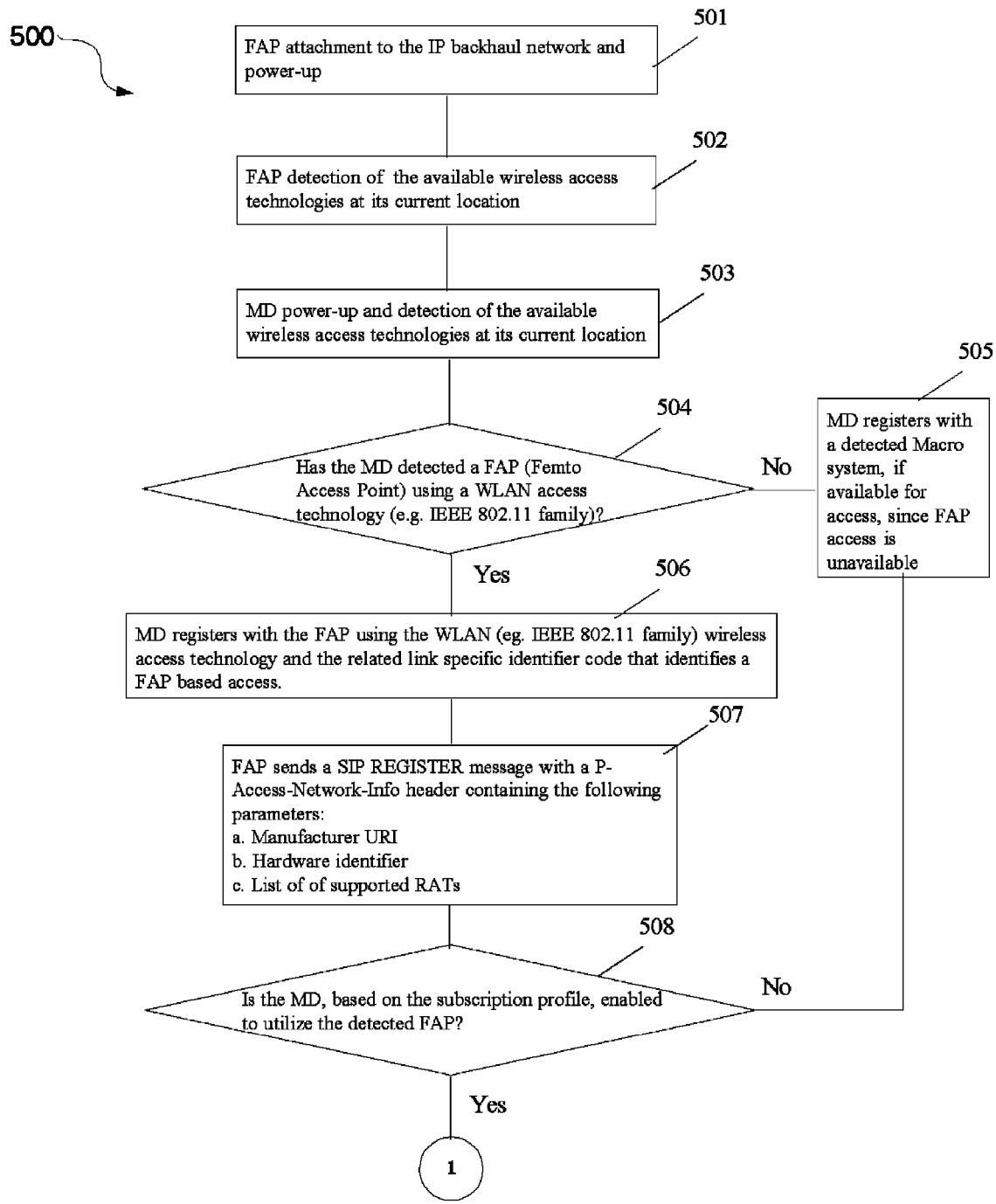
FIG. 5 is a flow chart illustrating a process control logic for an enhanced configuration and handoff scheme according to an embodiment of the invention.
Figure 6:
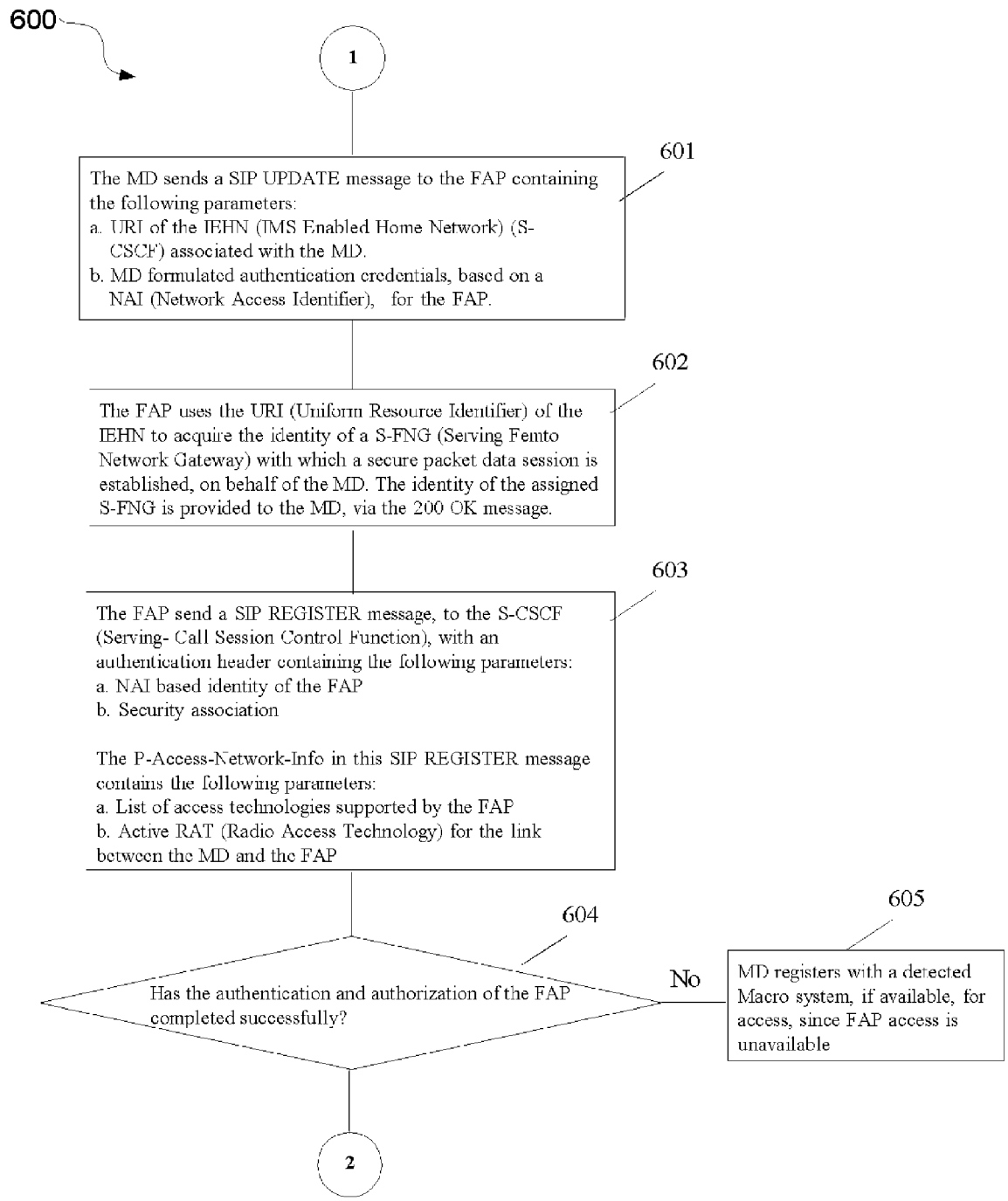
FIG. 6 is a flow chart illustrating a further process control logic for an enhanced configuration and handoff scheme according to an embodiment of the invention.
Figure 7:
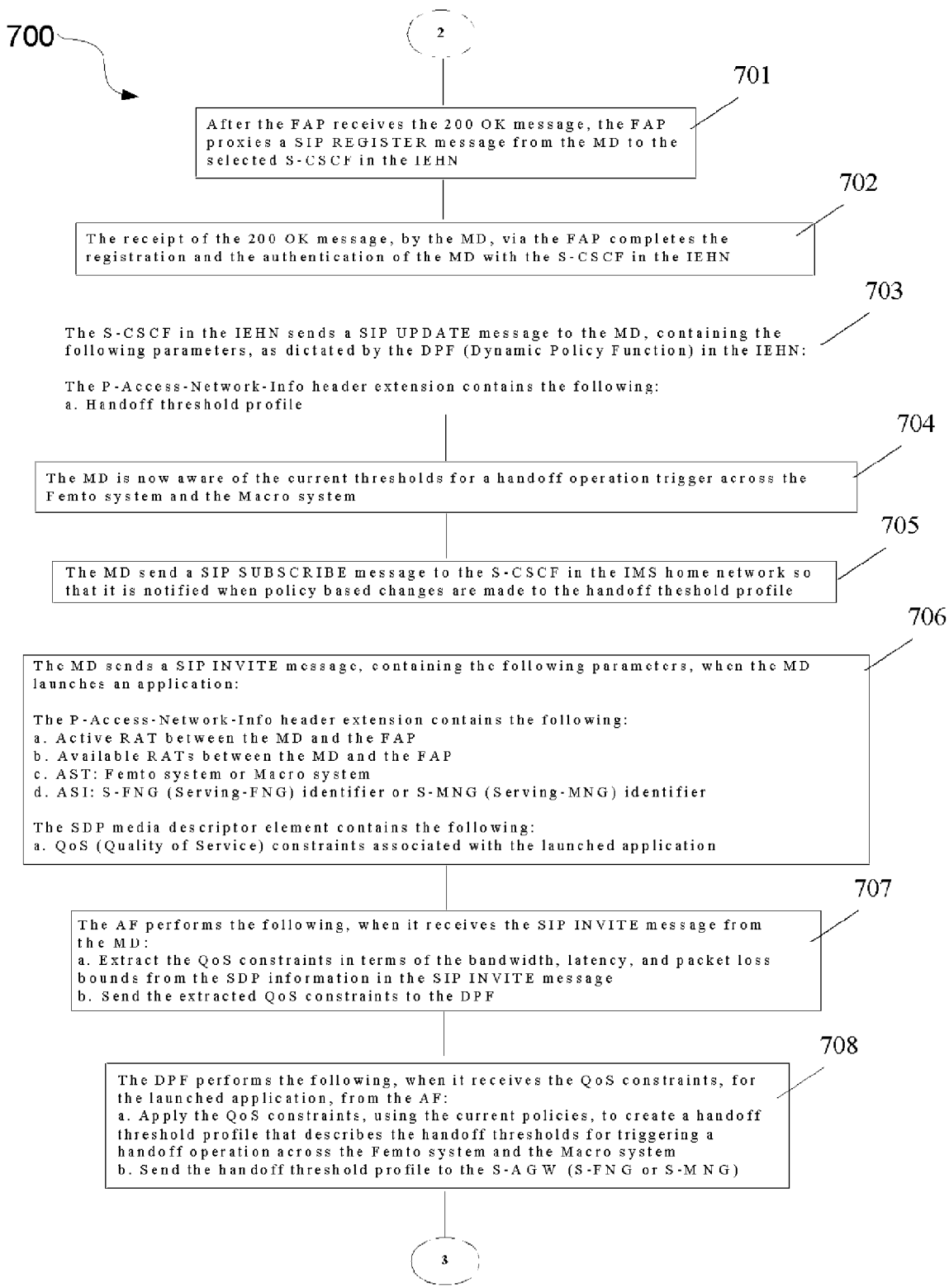
FIG. 7 is a flow chart illustrating a further process control logic for an enhanced configuration and handoff scheme according to an embodiment of the invention.
Figure 8:
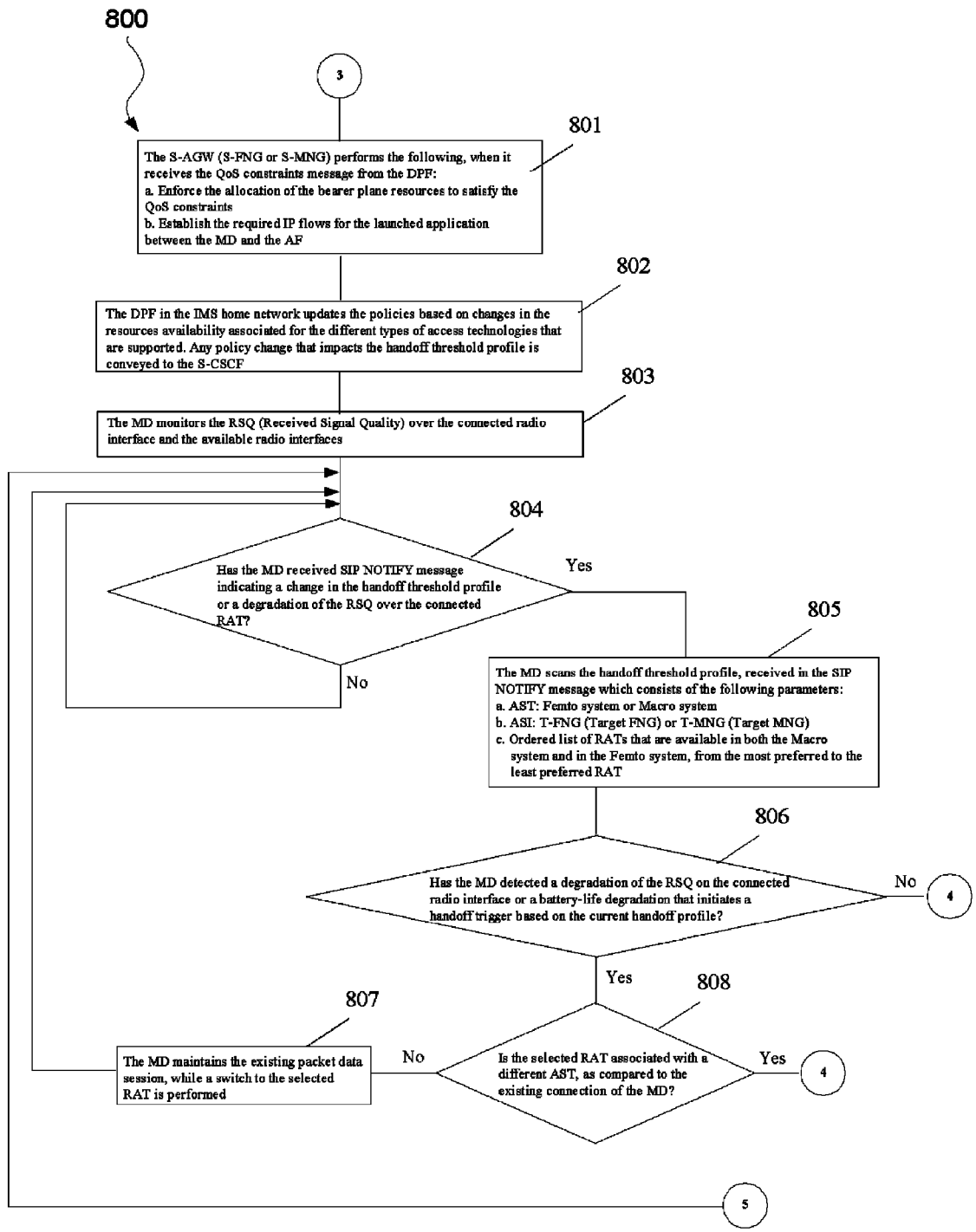
FIG. 8 is a flow chart illustrating a further process control logic for an enhanced configuration and handoff scheme according to an embodiment of the invention.
Figure 9:
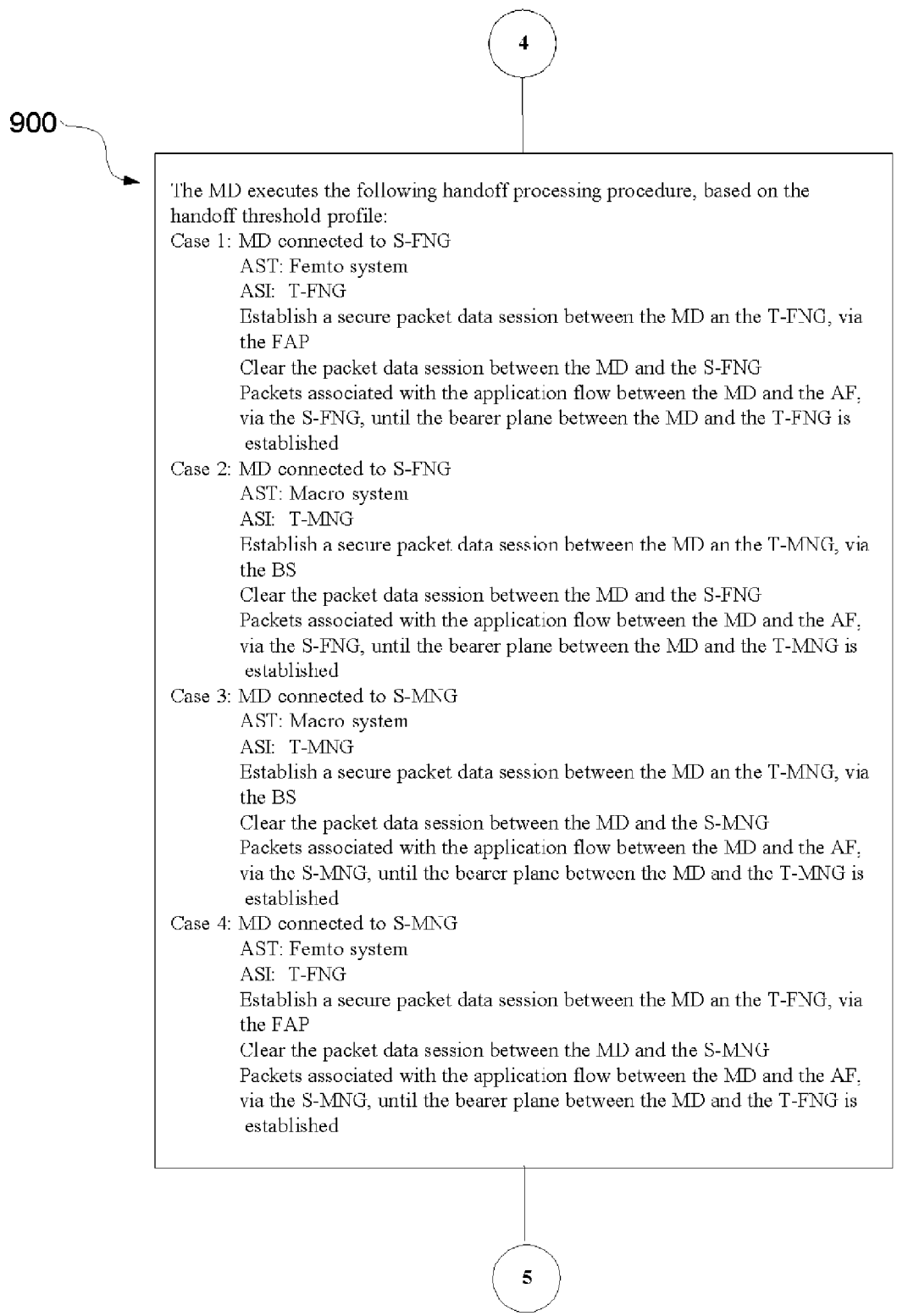
FIG. 9 is a flow chart illustrating a further process control logic for an enhanced configuration and handoff scheme according to an embodiment of the invention.

The algorithm for the enhanced configuration and handoff scheme for Femto systems in an embodiment of the invention is shown in FIGS. 5-9. Referring to FIG. 5, the process 500 executes starting with FAP attachment to the IP backhaul network and power up at stage 501. The process 500 continues through stages 502-508. If the decision at stage 508 is affirmative, the process continues to the process "1" illustrated as process 600 of FIG. 6. Otherwise the process 500 terminates at stage 508.

At stage 601 the process 600 begins. After flowing through stages 601-604, if the decision at stage 604 is affirmative, the process continues to the process "2" illustrated as process 700 of FIG. 7. Otherwise, the process 600 terminates at stage 605.

Process 700 begins At stage 701. After flowing through stages 701-708, the process 700 continues to the process "3" illustrated as process 800 of FIG. 8.

At stage 801 the process 800 begins. If the decision at stage 806 is negative, or the decision at stage 808 is affirmative, the process continues to the process "4" illustrated as process 900 of FIG. 9. In addition, after execution of process 900, the process may return to process 800 via the stage labeled as "5."

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for providing an enhanced mobile hand-off scheme, the method comprising:
  launching an application, on a mobile device, supported by mobile wireless communications between the mobile device and mobile wireless access networks, wherein the application is associated with a quality of service (QoS) constraint;
  providing, by the mobile device, the QoS constraint to a dynamic policy function;
  receiving, by the mobile device, a handoff threshold profile created by the dynamic policy function, the handoff threshold profile being used by the mobile device to trigger an access network handoff operation, on the mobile device, and the handoff threshold profile being based on at least:
    the QoS constraint associated with the application, and
    network policies specified for a set of access networks, the network policies being based at least in part on network condition parameter values of the access networks;
  receiving, by the mobile device pursuant to a change-based subscription service, an updated handoff threshold profile generated by the dynamic policy function in response to a change to the network policies; and scanning, by the mobile device, the updated handoff threshold profile; and triggering, by the mobile device, in response to scanning the updated handoff threshold profile, a mobile handoff for the mobile device from a current access network to a target access network, wherein each of the current and target access networks is selected from the group consisting of:
 a femto access network, and
 a macro access network.

2. The method of claim 1, wherein the network policies are based upon network conditions comprising one or more of the group consisting of: bandwidth, latency, packet loss, and system capacity.

3. The method of claim 1, wherein the network policies comprise statically provisioned policies based on one or more of the group consisting of: system capacity, system utilization, and subscription profiles.

4. The method of claim 1, wherein the mobile device supports communications based on at least one of an Institute of Electrical and Electronics Engineers (IEEE) 802.11 and an IEEE 802.16 technique.

5. The method of claim 1, further comprising:
 sending a request message to the current access network for subscribing to the updated handoff threshold profile; and
 receiving the updated handoff threshold profile through a notification message from the current access network.

6. The method of claim 1, wherein the handoff threshold profile comprises an access system type, an access system identifier list, and a radio access technology list.

7. The method of claim 6, wherein the access system type is indicative of one of the group consisting of: femto and macro access systems.

8. The method of claim 6, wherein the access system identifier list is indicative of a list of access systems available to the mobile device and the access systems are listed from the highest to the lowest priority.

9. The method of claim 6, wherein the radio access technology list is indicative of a list of radio access technologies available to the mobile device and the radio access technologies are listed from the highest to the lowest priority.

10. The method of claim 1, further comprising:
 monitoring a received signal quality and a battery life condition of the mobile device;
 determining based on the handoff threshold profile that at least one of the received signal quality and the battery life condition has a change sufficient to trigger the mobile handoff; and
 initiating the mobile handoff in response to the change of at least one of the group consisting of: the received signal quality and the battery life condition.

11. A method for providing an enhanced mobile hand-off scheme in a wireless network, the method comprising:
 establishing a first communication session between a mobile device and a first access network for supporting an application, wherein the application is associated with a quality of service (QoS) constraint;
 communicating, by the mobile device, the QoS constraint associated with the application to the first access network;
 creating a handoff threshold profile based on at least:
  the QoS constraint associated with the application, and
  network policies specified for a set of access networks, the network policies being based at least in part on network condition parameters of the access networks;
 updating the handoff threshold profile in response to changes in the network policies; and
 upon determining that the handoff threshold profile has a change sufficient to trigger a mobile handoff, performing the mobile handoff from the first access network to a second access network for establishing a second communication session, wherein each of the first and second access networks is selected from the group consisting of: a femto access network and a macro access network.

12. The method of claim 11, further comprising:
 receiving an SIP INVITE message from the mobile device;
 extracting the QoS constraint from the Session Initiation Protocol (SIP) INVITE message;
 sending the QoS constraint to a dynamic policy function; and
 creating the handoff threshold profile at the dynamic policy function.

13. The method of claim 11, further comprising:
 sending the handoff threshold profile to the second access network;
 enforcing at the second access network an allocation of bearer plane resources to satisfy the QoS constraint;
 establishing the second communication session through the second access network; and
 clearing the first communication session.

14. A system for providing an enhanced mobile hand-off scheme in a wireless network, the system comprising:
 a mobile device for executing an application and communicating with first and second access networks, wherein the application has a quality of service (QoS) constraint and the mobile device monitors a handoff threshold profile;
 a dynamic policy function for creating the handoff threshold profile based at least in part on:
  the QoS constraint, and
  network policies specified for a set of access networks, the network policies being based at least in part on network condition parameters of the access networks, wherein the dynamic policy function updates the handoff threshold profile in response to changes in the network policies; and
 wherein the mobile device determines the handoff threshold profile has a change sufficient to trigger a mobile handoff and performs the mobile handoff between the first and second access networks in response to the change in the handoff threshold profile, wherein each of the first and second access networks is selected from the group consisting of: a femto access network and a macro access network.

15. The system of claim 14, wherein the network policies are further influenced by network conditions comprising one or more conditions from the group consisting of: bandwidth, latency, packet loss, and system capacity.

16. The system of claim 14, wherein the network policies comprise statically provisioned policies based on one or more of system capacity, system utilization, and subscription profiles.

17. The system of claim 14, wherein the change of the network policies is indicative of a change of system parameters of at least one of the access networks.

18. The system of claim 14, wherein the mobile device sends a message to at least one of the access networks upon launching an application, the message including the QoS constraint associated with the application, the system further comprising:

an application function for receiving the message and, wherein the application function extracts the QoS constraint from the message and transmits the QoS constraint to the dynamic policy function.

19. The system of claim 18, wherein each of the access networks is capable of enforcing an allocation of bearer plane resources to satisfy the QoS constraint of the application and establishing a communication session required by the application between the mobile device and the application function.

20. The system of claim 14, wherein the mobile device monitors a received signal quality and a battery life condition, determines, based on the handoff threshold profile, that at least one of the received signal quality and the battery life condition has a change sufficient to cause a mobile handoff, and initiates the mobile handoff in response to the change of at least one of the received signal quality and the battery life condition.

21. The system of claim 14, wherein the handoff threshold profile comprises an access system type, an access system identifier list, and a radio access technology list.

* * * * *